May 17, 1966     H. J. HANSEN     3,251,574

PRESSURE RELEASE BUTTON

Filed July 1, 1963

INVENTOR.
HOWARD J. HANSEN
BY Williams, David,
Hoffmann & Yount
ATTORNEYS

United States Patent Office 3,251,574
Patented May 17, 1966

3,251,574
PRESSURE RELEASE BUTTON
Howard J. Hansen, Bay Village, Ohio, assignor to The Hansen Manufacturing Company, Cleveland, Ohio, a corporation of Ohio
Filed July 1, 1963, Ser. No. 291,821
6 Claims. (Cl. 251—149.7)

The present invention relates to a device for releasing the pressure in a closed chamber having an outlet valve, and particularly to a device for maintaining an outlet valve of a container in an open position to communicate the interior of the container with the atmosphere surrounding the container and thereby vent or release the pressure in the container.

A particular problem for those who dispense beverages, such carbonated soft drinks, from pressurized valved containers is the venting or releasing of the gaseous pressure in the container after it is emptied and before it is shipped back to the beverage supplier. Shipping of these empty containers without releasing the gaseous pressure is a safety hazard and should be avoided. In the past, certain prior art devices have been used to hold the valves of such containers open to release the gaseous pressure therein after the containers have been emptied. These prior art devices are cumbersome and relatively expensive. Moreover, once the pressure in a container is released by a prior art device, the prior art device is removed from the container and it is impossible to visually distinguish the vented container from one not vented, and often a container previously vented is again vented, and moreover, full containers at times are vented, with the resultant spillage of fluid from the container.

Accordingly, the principal object of the present invention is the provision of a new and improved pressure release device for releasing the pressure in a container wherein the device is simple in construction, reliable in operation, relatively inexpensive, easily used, and provides a visual indication that the container has been vented.

A further object of the present invention is the provision of a new and improved pressure release device for releasing the pressure in a container upon insertion of the device into a valved opening in the container and which remains positioned in the opening to provide a visual indication that the container has been vented.

A more specific object of the present invention is the provision of a new and improved pressure release device for releasing the pressure in a container having an outlet valve member biased to a closed position by a spring means and wherein the pressure release device is a button type device including a readily gripped disk-like base portion and a valve opening portion extending from the disk-like base portion and engageable with the valve member and movable against the bias of the spring means to a pressure release position wherein it holds the valve member in an open position.

A further object of the present invention is the provision of a new and improved pressure release device, as noted in the next preceding paragraph, wherein the valve opening portion includes portions which are movable inwardly of the opening or contract toward each other when being inserted through the valved opening in the container and expand upon insertion so as to prevent movement of the device through the opening in the container due to the force applied by the biasing spring.

A further object of the present invention is the provision of a new and improved pressure release device wherein the valve opening portion consists of a pair of elongated members having a slot therebetween providing a passageway communicating the interior of the container with the atmosphere surrounding the container, and wherein the elongated members are yieldably connected to a base member, and move toward each other when being inserted through the valved opening and away from each other when through the opening to lock the device in pressure release position against movement therefrom by a spring means biasing the valve member to its closed position.

Further objects and advantages of the present invention will be apparent to those skilled in the art to which it relates from the following detailed description thereof made with reference to the accompanying drawings forming a part of this specification and wherein.

Figure 1:
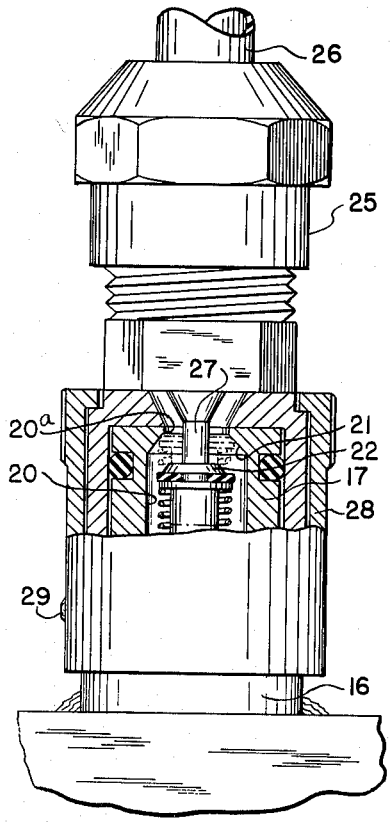
FIG. 1 is a cross-sectional view, partly in elevation, of an apparatus with which the pressure release device of the present invention is usable.

The present invention relates to a pressure release device for releasing the pressure in an enclosure having a valved outlet opening including a valve seat and a valve member engaging the valve seat. Primarily, the present invention relates to a device for venting empty carbonated beverage containers which previously contained carbonated beverages under pressure. Such containers are vented prior to shipment of the container back to the beverage supplier.

As representing the preferred embodiment of the present invention, a pressure release device 10 is illustrated in the drawings and comprises a disk-like base part 11 which is readily gripped for handling of the device and an elongated valve opening part 12 connected to the disk-like base part and extending therefrom. The device 10 is usable for releasing the gaseous pressure in an empty carbonated beverage container 13, only a portion of which is illustrated in the drawings, and which has an outlet opening, not shown, communicating with the interior of the container.

The container 13 supports an outlet valve means 15 which controls the flow of fluid from the container through the outlet opening to a suitable dispensing device, not shown. The valve means 15 may be of any suitable construction and is shown herein, by way of example, as including a member 16 secured, as by welding, to the container and having portion 17 connected thereto. The member 16 has a passageway therethrough, not shown, which communicates with the opening in the container, and the portion 17 has a passageway 20 therethrough communicating with the passage through member 16.

The portion 17 at its end remote from the container 13 has a tapered valve seat 21 which encircles the outlet end or opening 20a of the passageway 20. The portion 17 supports a valve member 22 which is biased by a spring means 23 in a direction towards engagement with the valve seat 21. The valve member 22 has an open position out of engagement with the valve seat, as shown in full lines in FIG. 1, wherein it permits fluid flow from the container, and a closed position in engagement with the valve seat, as shown in dot-dash lines in FIG. 1, and wherein it blocks or prevents fluid flow from the container.

In order to remove the liquid, such as a carbonated beverage, from the container 13 when it is filled, a suitable quick-disconnect coupling member 25 is provided which co-operates with the valve means 15. The quick-disconnect coupling member 25 is connected to a conduit 26 which leads to the dispensing device, not shown. The quick-disconnect coupling member 25 is effective when connected to the valve means to move the valve member 22 to its open position and hold it in its open position, as will be described hereinbelow. Preferably, the container is maintained under a gaseous carbon dioxide pressure, and when the dispensing device is operated, the beverage in the container flows from the container through valve means 15 and conduit 26 to the dispensing device.

The quick-disconnect coupling member 25 which moves valve member 22 to its open position is of conventional construction and will not be described in great detail. It does, however, include a nose member 27 which engages the valve member 22 when in its closed position and forces the valve member against the bias of the spring means 23 away from the valve seat 15 into its open position, as shown in full lines in FIG. 1, and holds the valve member in its open position when the coupling member 25 is connected to the valve means 15 through a locking sleeve 28 which engages bayonet pins 29 on the member. It should be noted that upon disconnection of the quick-disconnect coupling member 25 from the valve means 15, the valve member 22 is moved to its closed position by the biasing spring 23 wherein it engages the valve seat 21 and blocks the flow from the container 13.

When the container 13 is emptied of the beverage contained therein, the quick-disconnect coupling member 25 is disassociated or disassembled from the valve means 15, and the valve member 22 moves to its closed position, as described above, however, the interior of the container 13 remains under a gaseous pressure. The container 13 is then stored for shipment back to the supplier. However, the pressure in the container should be released therefrom prior to shipment back to the supplier and, as noted above, the pressure release device 10 is used to release or vent the pressure in the container 13 to the atmosphere surrounding the container.

As mentioned hereinabove, the pressure release device 10 includes a disk-like base part 11 and an elongated valve opening part 12 extending from the base part 11. The base part 11 is in the form of a disk or button-like member and is readily gripped for handling and manipulating the device 10, and in the preferred embodiment includes a concave recess 38 in the outer surface thereof for receiving the thumb of the person using the device, for a purpose to be described hereinbelow.

The valve opening part 12 is connected to the base part 11 and comprises a pair of projecting members 41, 42, connected to the base part 11 inwardly of the outer edge thereof. The projecting members 41, 42 are preferably annular in cross section and are spaced apart and thereby define a slot 43 therebetween. The projecting members 41, 42 are identical in construction and thus only projecting member 41 will be described herein in detail. However, the same reference characters used to designate portions of projecting member 41 are used to designate corresponding portions of projecting member 42.

The projecting member 41 includes an elongated portion 45 connected at one end to the base part 11. The elongated portion 45 has a tapered outer surface and has its greatest cross-sectional dimension adjacent the base part 11 and thus tapers inwardly as its outer surface extends away from the base part 11. The end of the elongated part 45 remote from the base part 11 supports an enlarged portion 48.

The enlarged portion 48 includes a valve engaging surface portion 50 on the outermost end thereof and which extends substantially parallel to the disk portion 11. A tapered surface portion 51 intersects the surface portion 50 and tapers outwardly away from the valve engaging surface portion 50, and intersects a cylindrical surface portion 52 which is located radially outwardly from the outermost end of the elongated tapered portion 45, and thus provides a shoulder 53 formed by the radially extending surface of the enlarged portion 48 which is adjacent the elongated portion 45 and extends parallel to valve-engaging surface portion 50.

Figure 5:
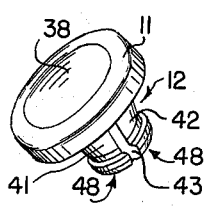
FIG. 5 is an end elevational view looking at the pressure release device of FIG. 4 from the left side thereof.
Figure 6:
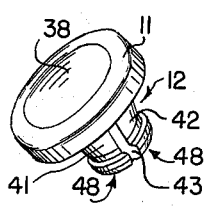
FIG. 6 is a perspective view of the pressure release device shown in FIG. 2.

The cross-sectional configuration of the pair of enlarged portions 48 and the portion of the slot 43 therebetween preferably conforms substantially with the configuration of the opening encircled by the valve seat 21. In the present embodiment, this cross section is circular and the diameter thereof, as measured at the cylindrical surface portion 53 and designated A in FIG. 5, is larger than the diameter of the opening 20a. The width of an enlarged portion 48 as measured at B is preferably slightly less than the diameter of the opening 20a. This dimension is less than dimension A since the space 43 is on the diameter and dimension B is parallel to the diameter but spaced from the diameter. The diameter of the valve opening part 12 as measured across surfaces 50 thereof is preferably slightly smaller than the diameter of the opening defined by the valve seat 21.

In use the pressure release device 10 is inserted into opening 20a and functions to move the valve member 22 out of engagement with the valve seat and to an open position and holds the valve member in its open position to vent the gaseous pressure in the container 13 to the atmosphere. Specifically, the valve opening portion 12 of the pressure release device 10 is inserted through the opening 20a encircled by the valve seat 22, and the surfaces 50 are positioned to engage the valve member 21 and a force is applied to the device 10, preferably by the thumb positioned in the concave recess 38, causing the device 10 to move in a direction opposite the direction of the bias of spring 23. This force is maintained until the enlarged portions 48 of the projecting members 41, 42 are inserted through the opening 20a. In order to provide for movement of the enlarged portions 48 through the opening 20a, the valve opening part 12 is resiliently displaceable and contracts in cross section so that surfaces 52 will clear the opening 20a. This contraction or displacement is provided by movement of the projecting members 41, 42 inwardly toward each other as the enlarged portions 48 are inserted through the opening. The projecting members 41, 42 are resiliently or yieldably connected to base part 11 so as to provide movement thereof relative to the base part. This resilient connection in the preferred embodiment is provided by the material of which the device 10 is made, namely, a plastic material such as nylon. The device 10 is a one-piece device wherein the projecting members 41, 42 and base part 11 are integral and made of nylon and it may be readily manufactured by a conventional molding process. It should be apparent, however, that other suitable materials or construction may also be used to permit the above-noted contraction.

As the enlarged portions 48 are inserted through the opening 20a, the tapered surface portions 51 of the projecting portions 41 and 42 engage opposite wall portions defining the opening 20a and are cammed inwardly of the opening 20a and toward each other and are thus disposed so as to clear opening 20a for insertion through the opening 20a. When surfaces 53 are disposed through the opening 20a, the valve opening part 12 expands. This expansion occurs by the enlarged portions 48 moving outwardly away from each other, and the shoulders 53 engage the valve seat 22 and block movement of the device 10 by the spring 23, thus locking the device 10 in pressure release position. The shoulders 53 form a part of the valve opening part 12 and comprise means for locking or holding the valve opening part in its pressure release position.

The movement of the valve engaging portion 12 in the direction against the bias of the spring 23 is limited by the engagement of the outer tapered surface of the elongated portion 45 with the walls of the opening 20a. The length of the elongated portions 45 in relation to the axial length of the opening 20a is such that a space 55 is provided between the upper surface of the nose member 17 and the under surface of the base part 11, when the device 10 is in its pressure release position, for a purpose to be described hereinbelow.

Figure 2:
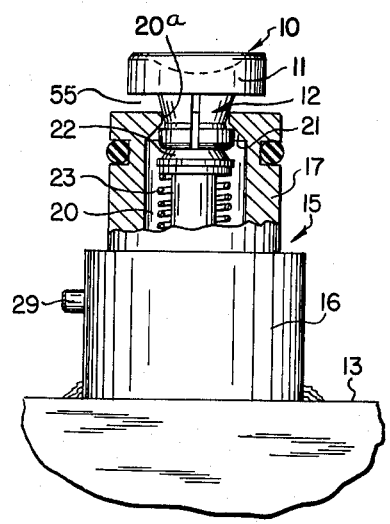
FIG. 2 is a cross-sectional view, partly in elevation, of a part of the apparatus shown in FIG. 1 and a pressure release device embodying the present invention in its operative position.
Figure 3:
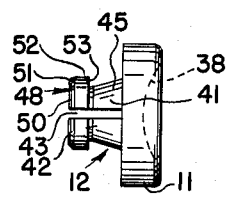
FIG. 3 is a side elevational view of the pressure release device shown in FIG. 2.
Figure 4:
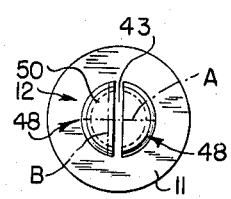
FIG. 4 is a top plan view of the pressure release device as shown in FIG. 3.

When the pressure release device 10 is in its pressure release position illustrated in FIG. 2, it should be apparent that the gaseous pressure in the container 13 is released to the atmosphere surrounding the container. The pressure release device 10 holds the valve member 22 in its open position and the slot 43 provided between the projecting portions 41, 42 functions as a fluid passageway communicating the interior of the container 13 with the atmosphere surrounding the container. The pressure release device 10, being relatively simple and inexpensive to manufacture, preferably remains in the pressure release position, shown in FIG. 2, after the container has been vented, and thereby functions as a visual indication that the container has been vented. Therefore, an operator in charge of venting the containers can readily determine that the container has been vented, and thus will not attempt to vent the container again.

When the containers are received by the supplier or at any other time that it is desirable to remove the pressure release device 10 from the position shown in FIG. 2, the space 55 provided between the inner surface of the base member 11 and the outer surface of the nose member 17 permits ready gripping of the device 10 which may be then forced or pulled from the opening 20a. When the device 10 is removed from the opening, the shoulder 53 co-operates with the tapered valve seat 21 and the cross section of the valve opening portion 12 contracts to permit surface 53 to move through the opening 20a. Removal from the opening permits the valve member 22 to move to its closed position, as should be apparent.

While the present invention has been described in considerable detail hereinabove, it should be apparent that certain changes and modifications may be made therein by those skilled in the art and it is hereby intended to cover all changes, modifications and adaptations falling within the scope of the appended claims.

Having described my invention, I claim:

1. A one-piece molded plastic cap for releasing the pressure in a container having a valve seat around an opening communicating with the interior of the container and a valve member biased by a spring means into engagement with the valve seat to close the opening, said cap including a disk-like base member, a pair of spaced resiliently displaceable projecting members connected to the base member and extending therefrom and defining a passageway therebetween, each of said projecting members including an elongated portion connected at one end to the base member and of a length greater than the length of said opening and having an enlarged valve engaging portion connected to the other end thereof, said enlarged valve engaging portions having a valve engaging surface portion movable through said opening to a pressure release position holding said valve in an open position and a cross-sectional dimension larger than the corresponding dimension of the opening, said enlarged portions having surfaces which engage surfaces defining said opening and effect displacement of said projecting members inwardly to provide for said enlarged valve engaging portions to pass through said opening, said projecting portions moving outwardly upon insertion of said enlarged portions through said opening and including means for holding said valve engaging surface portions in said pressure release position against the bias of said spring means whereby pressure in said container is released to the atmosphere through said passageway.

2. A cap as defined in claim 1 wherein said valve engaging surface portions extend substantially parallel to said disk-like base member and said disk-like base member is a solid member.

3. A cap as defined in claim 1 wherein said projecting members taper inwardly from said base member and have a cross-sectional dimension at one point greater than the cross-sectional dimension of said opening and are connected to said base member inwardly of the outer periphery thereof.

4. In combination, a shipping container for a liquid under gaseous pressure and from which the liquid is removed, said container having a valve seat encircling an opening communicating with the interior of the container and a valve member biased by a spring means into engagement with the valve seat to close the opening, said opening comprising the opening through which the liquid is removed from said container, and means for releasing the gaseous pressure from said container after the liquid is removed therefrom and for providing a visual indication that the gaseous pressure has been released, said means including a base part and an elongated part extending from said base part and connected thereto, a valve engaging part connected to the end of said elongated part opposite the end connected to said base part, said valve engaging part being engageable with said valve member and insertable through the opening against the bias of the spring means to move the valve member to an open position out of engagement with the valve seat, said valve engaging part having at least one cross-sectional dimension larger than the corresponding dimension of the opening and portions movable in a direction toward the center of the opening while being inserted through the opening, said portions being movable in a direction outwardly of the center of the opening after being inserted through the opening and having surfaces which engage said valve seat to block movement of the valve opening part out of the opening by the spring means, and means providing a fluid passageway communicating the interior of the container with the atmosphere surrounding the container to vent the gaseous pressure in the interior thereof to the atmosphere.

5. In combination, a shipping container for a liquid under gaseous pressure and from which the liquid is removed, said container having a valve seat encircling an opening communicating with the interior of the container and a valve member biased by a spring means into engagement with the valve seat to close the opening, said opening comprising the opening through which the liquid is removed from said container, and means for releasing the gaseous pressure from said container after the liquid is removed therefrom and for providing a visual indication that the gaseous pressure has been released, said means comprising a one-piece molded plastic device including a relatively flat solid base part and an elongated part connected to and extending from said base part, said elongated part having a valve engaging end surface engageable with the valve member and movable into said interior against the bias of said spring means to move said valve member to its open position, said elongated portion at its end adjacent said end surface being of cross-sectional dimension larger than said opening and having first surface portions engageable with second surface portions defining the opening in said container and co-operable therewith to effect contraction of said first surface portions to clear said opening and move into said interior, said first surface portions being expansible upon positioning in said interior to position third surface portions of said elongated portion to engage fourth surface portions defining said interior adjacent said opening and to block movement of said elongated portion from said interior by said spring means, and said elongated portion having a fluid passageway therethrough communicating said interior with the atmosphere when said valve engaging portion extends into said interior.

6. In combination, a shipping container for a liquid under gaseous pressure and from which the liquid is removed, said container having a valve seat encircling an opening communicating with the interior of the container and a valve member biased by a spring means into engagement with the valve seat to close the opening, said opening comprising the opening through which the liquid is removed from said container, and means for releasing the gaseous pressure from said container after the liquid is removed therefrom and for providing a visual indication that the gaseous pressure has been released, said means including a one-piece molded plastic cap member including a relatively flat solid disk-like base member, a pair of spaced resiliently displaceable projecting members connected to the base member at a point inwardly of the outer periphery thereof and extending therefrom and defining a passageway therebetween, each of said projecting members including an elongated portion of a length greater than the length of said opening and having an enlarged valve engaging portion connected to the other end thereof, said enlarged valve engaging portions having a valve engaging surface portion movable through said opening to a pressure release position holding said valve in an open position and a cross-sectional dimension larger than the corresponding dimension of the opening, said enlarged portions having surfaces which engage surfaces defining said opening and effect displacement of said projecting members inwardly to provide for said enlarged valve engaging portions to pass through said opening, said projecting portions moving outwardly upon insertion of said enlarged portions through said opening and including means for holding said valve engaging surface portions in said pressure release position against the bias of said spring means whereby gaseous pressure in said container is released to the atmosphere through said passageway.

References Cited by the Examiner

UNITED STATES PATENTS

| | | | |
|---|---|---|---|
| 109,360 | 11/1870 | Warth | 137—322 X |
| 1,082,232 | 12/1913 | Nielsen | 137—523 X |
| 1,847,391 | 3/1932 | Fisher | 138—96 |
| 2,365,888 | 12/1944 | Linderfelt | 138—96 |

M. CARY NELSON, *Primary Examiner.*

W. R. CLINE, *Assistant Examiner.*